April 16, 1935.　　　S. ROSENZWEIG　　　1,998,206
VIBRATION DAMPER
Filed May 12, 1933　　　2 Sheets-Sheet 2
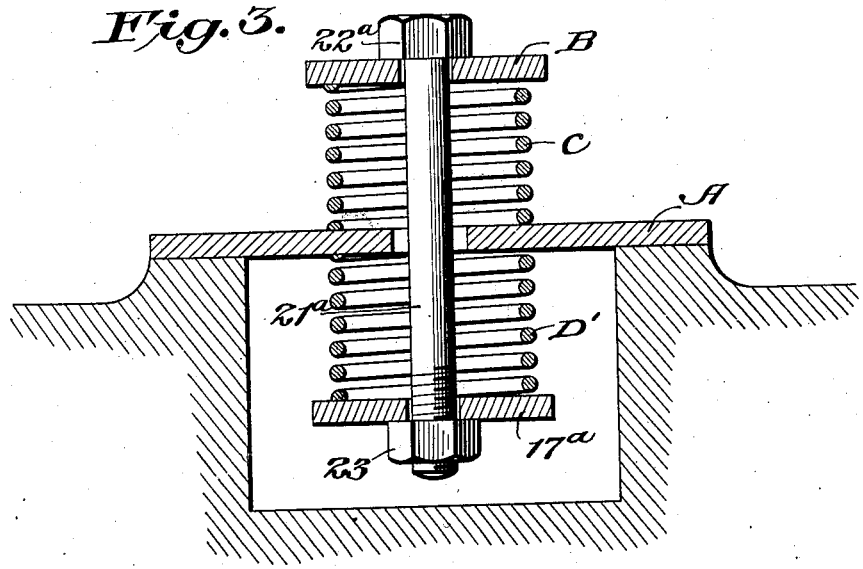
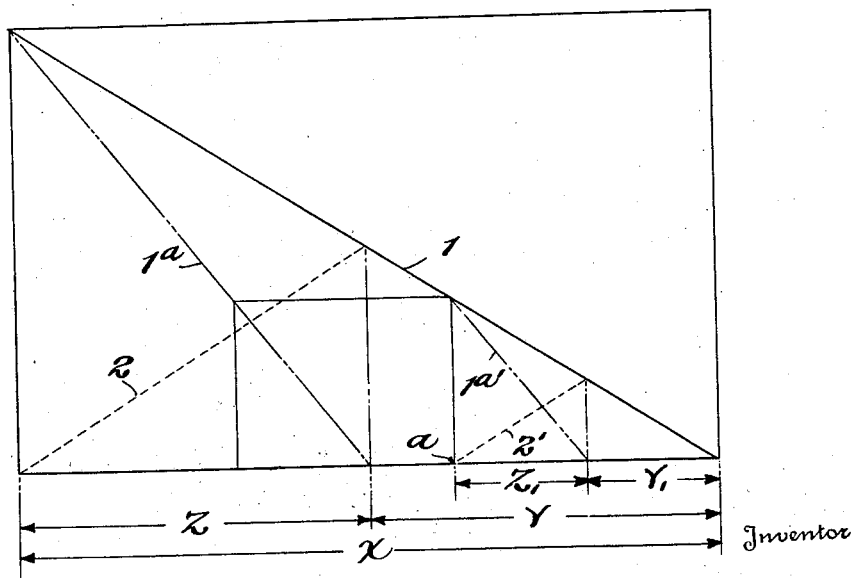
Siegfried Rosenzweig, Patented Apr. 16, 1935

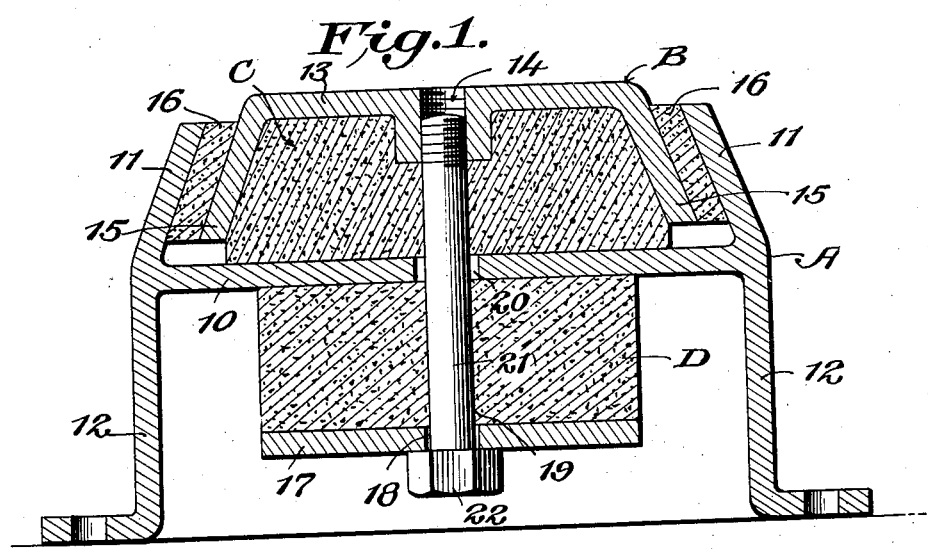
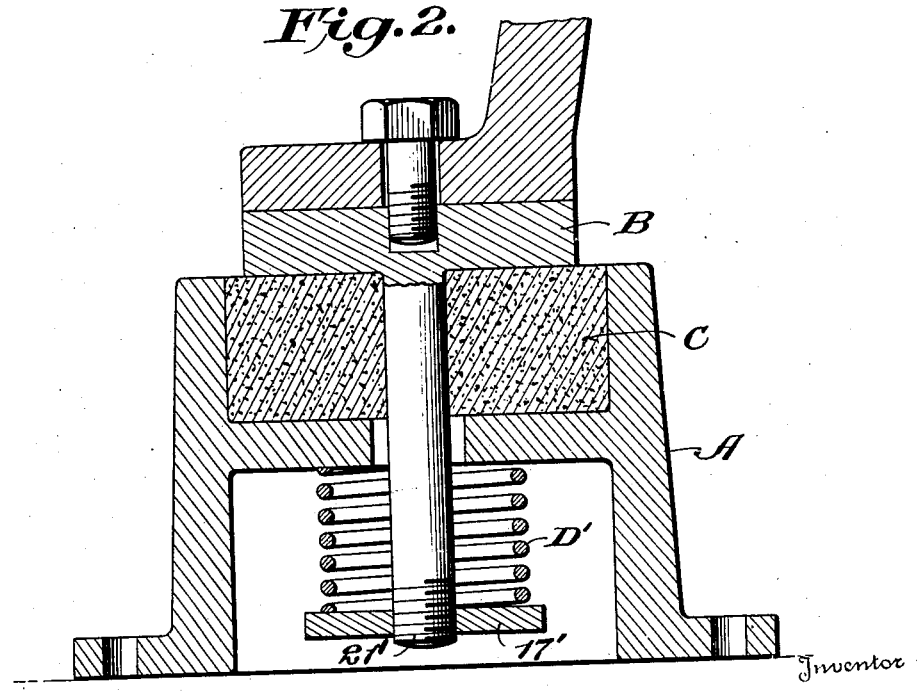

1,998,206

UNITED STATES PATENT OFFICE 1,998,206

VIBRATION DAMPER

Siegfried Rosenzweig, Long Island City, N. Y.

Application May 12, 1933, Serial No. 670,786

4 Claims. (Cl. 248—16)

This invention relates to the elastic suspension or supporting of vibrating bodies, and has generally in view to provide improved elastic suspension means to prevent or reduce the transmission of vibrations from machines and other vibrating bodies to floors or other foundations on which they are mounted.

According to the theory of elastic suspension the vibration transmissibility of any given elastic suspension element is best defined as the ratio of the disturbance produced in a foundation when the element is used, to that produced when the suspended vibrating body is rigidly attached to the foundation. By known formulas the vibration transmissibility curves of elastic suspension elements may be plotted, and such curves show that transmissibility decreases as the ratio of forced frequency (due to the machine) to the natural frequency of the isolator or suspension element increases. When this ratio equals 1.0, or both frequencies are alike, resonance exists and maximum vibration is transmitted. At a ratio of 1.41 the curve crosses the unit line indicating that the isolator does neither harm nor good. On the other hand, the transmissibility decreases very rapidly as the ratio increases and becomes for instance 0.2 at a ratio of 2.5 for zero damping.

Assuming that it is desired to screen the transmission of a 120 cycle hum caused by a three phase motor, experience has indicated that a ratio of 6 is necessary, and that this ratio serves also to screen effectively the upper harmonies of 240 and 360 cycles which usually are present. 120:6=20 cycles, which means that the natural frequency of the isolator must be 20 per second.

By the use of known formulas the necessary compression of any given elastic suspension element to produce a desired natural frequency may readily be calculated.

Steel springs in their action follow vibration transmissibility curves very closely and are perfectly elastic. Therefore they are well suited for use in the suspension of vibrating bodies, as also are such materials as rubber and cork, although rubber, and to a greater extent cork, in a measure lacks perfect elasticity. Consequently, when working with these materials a somewhat greater ratio must be chosen than is given in the transmissibility curve for an ideal or perfectly elastic element such as a coil spring, with the result that, under identical conditions, materials such as rubber and cork must be subjected to greater compression than steel springs.

In some installations steel springs may be used more advantageously than elastic materials such as rubber and cork. In other installations rubber or cork may be used most advantageously, while in still other installations a combination of rubber and cork or the like, or one of these materials in combination with steel springs may be used most advantageously.

To obtain the necessary compression of rubber, cork and similar materials the material must be loaded very heavily in most instances, but rarely is the machine to be suspended or supported of sufficient weight to furnish the required loading. Accordingly, attempts have been made heretofore to artificially load such materials as rubber, cork and the like by a vise-like clamping or bolting of the same between timbers, steel base elements or the like and the foundation. This, however, involves costly complications and is impractical. Moreover, it is impractical to reduce the area of suspension materials such as rubber, cork and the like to such an extent that the loading furnished by the weight of the machine is sufficient to cause the material to have the desired natural frequency.

Accordingly, the general object of the present invention is to provide what may be termed a balanced vibration damper in which the damping element interposed between the machine and its foundation is artificially loaded in a thoroughly practical manner, and in which the expansive force of the element is balanced by an elastic oppositely acting force, thus to cause the vibrations of the machine to be most effectively absorbed or damped.

Another object of the invention is to provide a balanced vibration damper embodying a novel construction whereby practically any desired combination of elastic elements or materials may be employed.

Another object of the invention is to provide a balanced vibration damper embodying a construction whereby the amount of compression of the elastic element may readily be varied and minutely controlled, thereby to provide for obtaining an action of the element most ideally suited to each individual installation.

With the foregoing and various other objects in view, which will become more fully apparent as the nature of the invention is better understood, the same consists in the novel features of construction, combination and arrangement of parts as will be hereinafter more fully described, illustrated in the accompanying drawings and defined in the appended claims.

In the drawings:—

Figure 1 is a transverse section through a vibration damping device constructed in accordance with one practical embodiment of the invention.

Figure 2 is a view similar to Fig. 1 illustrating an alternative embodiment of the invention.

Figure 3 is a view similar to Figs. 1 and 2 illustrating another alternative embodiment of the invention; and Figure 4 is a diagram illustrating the action of the device.

Referring to the drawings in detail, A in each of Figs. 1 to 3 designates generally a base which is suitably formed to be fastened securely and rigidly to a foundation, while B designates generally a preferably inherently rigid member which is suitably formed to have the machine or other vibrating body fastened thereto, and which is supported by the base A through the instrumentality of an interposed, artificially and elastically loaded elastic element designated generally as C.

Referring particularly to the embodiment of the invention illustrated in Fig. 1 of the drawings, it will be observed that the rigid base A is of hollow construction embodying an open-top channel formation having a bottom wall 10 and upwardly and inwardly directed side walls 11, and that depending from the said channel formation are legs or continuations of the side walls thereof, designated as 12, which are suitably formed to be engaged against and to be rigidly fastened to a foundation thus to support the channel formation with its bottom wall 10 in spaced relation thereto.

Referring further to Fig. 1, it will be observed that the member B is of open-bottom channel form and comprises a plate 13 having a medial, threaded socket formation designated as 14, and downwardly and outwardly directed side walls designated as 15. The external width of this member is suitably less than the internal width of the channel formation of the base A, preferably of such less width that it may readily be inserted into the latter channel formation through the open top thereof, and the side walls 15 of said member preferably have the same inclination as the side walls 11 of the base channel formation. However, both the width of the member B and the inclination of its side walls may vary considerably as compared with the width of the base channel formation and the inclination of its side walls.

Still referring to Fig. 1 of the drawings, it will be observed that the elastic element C interposed between the member B and the base A is illustrated as being comprised by a block of cork shaped to fit said member B and to extend below the free or bottom edges of the side walls 15 thereof.

Knowing the necessary loading or compression of the block C to have a desired natural vibration frequency for a given installation, artificial loading of said block may be effected and maintained by first compressing the same in any suitable manner between the member B and the bottom wall 10 of the base channel formation and thereafter inserting elastic strips 16 of cork, rubber or the like between the inclined side walls 11 and 15, said strips, because of the inclination of said side walls, serving to elastically key or lock the block C in a compressed condition between the member B and the base A so that it may have a definite amount of upward or outward movement.

The construction so far described obviously may be used as an elastic suspension or support without other elements, in which event provision for mounting the base A with the bottom wall 10 of its channel formation in spaced relationship to the formation manifestly is unnecessary. However, to obtain most satisfactory results and to provide a balanced damper in which the elastic element C is maintained elastically loaded, a second elastic element D is combined with the element C to function counter thereto.

According to the construction illustrated in Fig. 1, the second elastic element D also is in the form of a block of cork and is interposed between the under side of the wall 10 and a plate 17 which is spaced therebelow. The plate 17, the block D and the wall 10 are provided with alined openings 18, 19 and 20, respectively, and through these openings extends a bolt 21 which has its threaded end engaged in the threaded socket formation 14 and its head 22 cooperating with the under side of the plate 17. Consequently, by manipulation of said bolt the blocks C and D may be loaded and their loading may be minutely controlled, and, moreover, the block D serves to maintain the block C elastically loaded and balanced.

Obviously, the base A may be of any desired length and the blocks C and D as well as the member B and the plate 17 may be coextensve in length therewith, and a plurality of bolts 21 may be employed or, alternatively, short blocks C and D may be located at desired intervals along the base. In this connection, and as indicated by Fig. 2 of the drawings, it obviously is not necessary to have the side walls 10 and 15 of the base A and the member B inclined and to have the strips 16 interposed therebetween if the block D and the bolt 20 are employed in the combination. On the contrary, the said side walls 10 and 15 under such conditions may be disposed vertically or may be entirely eliminated, as also may be the strips 16.

Referring to Fig. 2 of the drawings, it will be observed that the construction is substantially the same as illustrated in Fig. 1 with the exception that the member B lacks side walls and the side walls of the channel formation of the base A are vertical, and that the elastic element D is in the form of a coil spring. As a further modification of the construction illustrated in Fig. 1, Fig. 2 indicates that the bolt 21' may be rigid with the member B and that it may have threaded, adjustable connection with the plate 17'.

Referring to Fig. 3 of the drawings, it will be observed that the construction and combination is, to all intents and purposes, the same as illustrated in Figs. 1 and 2 with the exception that the elastic elements C and D' both are in the form of coil springs. Fig. 3 also illustrates that the base A may take the form of a flat plate, that the foundation may be recessed to accommodate the elastic element D or D', and that the bolt 21ª may extend loosely through the base, the member B and the plate 17ª and may have its head 22ª cooperating with the member B and its nut 23 cooperating with the plate 17ª.

The action of the device is diagrammatically illustrated in Fig. 4 of the drawings wherein the line X represents the total travel or permissible loading or compression of the elastic element C, the line Y represents loading or compression of said element C, and the line Z represents loading or compression of the elastic element D or D'. If the initial compression given to the element C equals "Y", spring curves as indicated by the lines 1, 2 and 1ª result. On the other hand, if the initial compression of element C is as indicated by the line $Y_1$, spring curves as indicated by the lines 1, 1ᵃ′ and 2′ result.

To further illustrate the action, let it be assumed that the elastic element C has an initial compression equal to Y′. If the balancing elastic element D or D′ is made of exactly the same dimensions as element C, its initial compression must be the same as Y′. The spring curves are alike but oppose each other. The resultant forces are parallel to each other or, in other words, when a load is put on element C all resultant forces are alike.

When Y is 50% of the total permissible travel or compression of the element C, element D or D′ gives up its potential energy in a point $a$ as indicated. If the initial compression is less than 50% curve 1ᵃ′ will cross curve 1 and from there on follow the latter curve, since element D or D′ has given up all of its energy and after point $a$ has been reached will have no further function.

The important result taught by the diagram is that no matter how great may be the initial compression given the elastic elements, the functions of said elements are all alike and being parallel to each other their loadings are increased in identical manner.

The action of the present damper, as tests have shown, is instantaneous under the slightest impacts, and on account of its balanced arrangement it acts equally well in either direction. Moreover, the fact that it can be minutely adjusted and that any amount of added compression to its elastic elements does not affect its predetermined action is especially advantageous.

Without further description it is thought that the features and advantages of the invention will be readily apparent to those skilled in the art, and it will of course be understood that changes in the form, proportion and minor details of construction may be resorted to, without departing from the spirit of the invention and scope of the appended claims.

I claim:—

1. A vibration damper comprising a base to be fastened to a foundation, said base having a wall, a member at one side of said wall to have a vibrating body fastened thereto, an elastic element interposed between said member and the adjacent side of said wall, a second elastic element disposed at the other side of said wall, tension means connecting said elastic elements and maintaining them under compression against said wall, said tension means being freely movable relative to the wall to permit either elastic element to be further compressed and the other to correspondingly expand, the base further having an abutment disposed outwardly relative to said member, and an elastic element interposed between said member and said abutment.

2. A vibration damper comprising a base to be fastened to a foundation, said base having a wall provided with an opening, a member at one side of said wall to have a vibrating body fastened thereto, an elastic element interposed between said member and the adjacent side of said wall, a second elastic element disposed at the other side of said wall, a tension rod extending loosely through said elastic elements and loosely through the opening in said wall and cooperating at its ends with said member and the second mentioned elastic element, respectively, to maintain said elastic elements normally compressed and to permit either elastic element to be further compressed and the other to correspondingly expand, means whereby the effective length of said rod may be varied to vary the amount of compression of said elastic elements, the base having an abutment disposed outwardly with respect to said member, and an elastic element interposed between said member and said abutment.

3. A vibration damper as set forth in claim 1 in which the abutment is constituted by an inwardly inclined wall of the base, in which the member is provided with a substantially correspondingly inclined wall, and in which the last mentioned elastic element is interposed between said walls.

4. A vibration damper as set forth in claim 2 in which the tension rod is in the form of a bolt having its headed end cooperating with the second mentioned elastic element and its other end threaded into the member.

SIEGFRIED ROSENZWEIG.